J. S. Gochnauer,
Washing Machine.

N°62,026. Patented Feb. 12, 1867.

Witnesses:
Theo Tusch
J. A. Service

Inventor:
J. S. Gochnauer
Per Munn & Co
Attorneys

United States Patent Office.

JOSEPH S. GOCHNAUER, OF GOSHEN, INDIANA.

Letters Patent No. 62,026, dated February 12, 1867.

---

IMPROVED WASHING MACHINE.

---

The Schedule referred to in these Letters Patent and making part of the same.

---

TO ALL WHOM IT MAY CONCERN:

Be it known that I, J. S. GOCHNAUER, of Goshen, in the county of Elkhart, and State of Indiana, have invented a new and improved Washing Machine; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
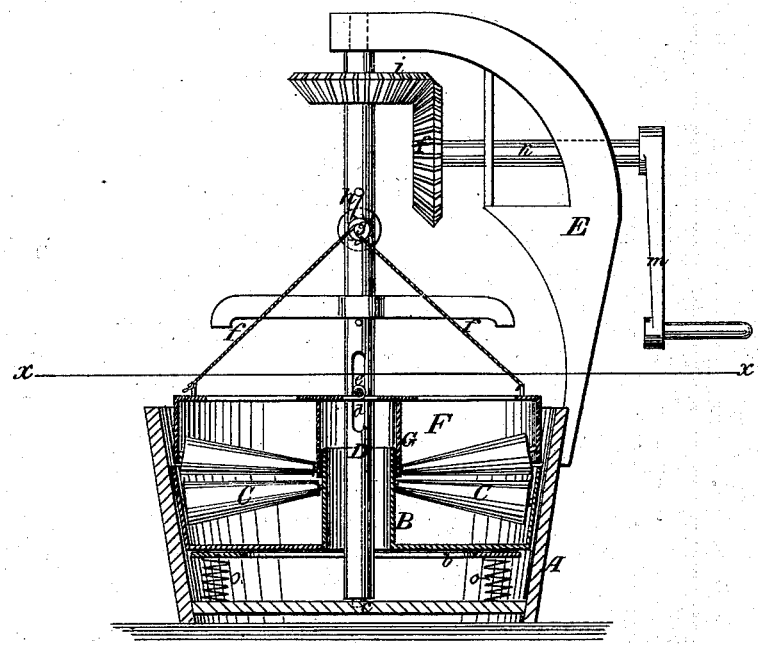
Figure 1 represents a vertical central section of this invention.
Figure 2:
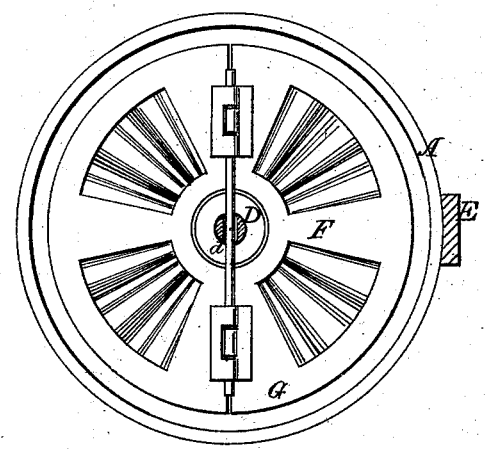
Figure 2 is a horizontal section of the same, the line $x$ $x$, fig. 1, indicating the plane of section.

This invention relates to a washing machine, which is composed of a yielding bed made of conical rollers, in combination with a corresponding conical roller rubber, consisting of two wings which are hinged together, and to which a revolving motion can be imparted by a vertical shaft, which catches over the rod that united the hinges of the two wings.

A represents a tub, which by preference is made round, and of any suitable size or shape. On the bottom of this tub I place a series of springs, $a$, which support a ring or disk, $b$, and on this ring rests a case, B, of metal, or any other suitable material, which forms the bearings for the axles of a series of conical rollers, C. These rollers are placed in radial positions, and quite close together, so that the same, in combination with the springs $a$, form a yielding bed. Through the centre of the case B rises the shaft D, which is stepped at the bottom in a suitable socket, $c$, and which has its bearings at the top in curved standard E, which is secured to the side of the tub A. The shaft D is provided with a slot, $d$, which catches over a rod, $e$, that serves to connect the two wings of the rubber F. The construction of this rubber is similar to that of the yielding bed, but the case G, which forms the bearings for the conical radiating rollers of the rubber, is made in two parts, which are connected by hinges, so that each wing can be turned up independent of the other. Suitable cords or ropes, $f$, extend from the wings of the rubber to a pin, $g$, which passes transversely through the vertical shaft D, and to which a revolving motion can be imparted by a button or any suitable handle. As the pin is revolved, the cords wind up thereon, and the wings are gradually raised. A pawl, $h$, which engages with the teeth of a ratchet-wheel that is mounted on the pin $g$, serves to retain the wings in any position to which they may be elevated. By withdrawing the rod $e$, either of the wings of the rubber can be removed, and by putting said rod back in its position, the remaining wing of the rubber can be used alone. This arrangement is desirable for fine goods. On the vertical shaft D is mounted a bevel-wheel, $i$, which gears in a corresponding bevel-wheel, $j$, mounted on a horizontal arbor, $k$, which has its bearings in the curved standard E, and on which is mounted a hand-crank, $m$, so that by turning said hand-crank a revolving or oscillating motion can be imparted to the vertical shaft D and to the rubber F.

The articles to be washed are placed between the rubber and the yielding bed, and by imparting to the rubber an oscillating or revolving motion, the operation of washing is effected.

What I claim as new, and desire to secure by Letters Patent, is—

The yielding bed, formed of a series of radiating conical rollers, in combination with a rubber, F, composed of a series of conical radiating rollers, and made in two parts, which are hinged together by a rod, $e$, passing through the vertical shaft D, substantially as and for the purpose described.

JOSEPH S. GOCHNAUER.

Witnesses:
LEWIS B. KURTZ,
AUGUST MARCHAND.